Patented Apr. 29, 1924.

1,492,027

UNITED STATES PATENT OFFICE.

HENRY A. GARDNER, OF WASHINGTON, DISTRICT OF COLUMBIA.

PROTECTIVE COATING COMPOSITION.

No Drawing.    Application filed November 29, 1922. Serial No. 604,084.

*To all whom it may concern:*

Be it known that I, HENRY A. GARDNER, a citizen of the United States, residing at Washington, in the District of Columbia, have invented certained new and useful Improvements in Protective Coating Compositions, of which the following is a specification.

This invention relates to protective coating compositions comprising the material known as rubber latex.

Rubber latex is the juice or emulsion-like liquid product obtained from certain trees and plants and used in the manufacture of rubber. It contains rubber, proteids, and resins apparently held in colloidal suspension in water. A typical composition of rubber latex is 30 per cent rubber, 10 to 15 per cent proteids, 50 per cent water, and variable amounts of resins.

In view of the composition of rubber latex and particularly on account of its rubber content it appears that if the solid constituents of the latex, either alone or in combination with other coating materials such as oils and pigments, could be deposited upon surfaces in the form of films, valuable protective coatings would be obtained.

Rubber latex as it comes from the tree is easily disturbed by atmospheric influences, carbon dioxide even causing precipitation of the rubber content. Fermentation which may develop upon standing also causes precipitation of the rubber content.

It is an object of my invention to so stabilize this rubber latex for coating purposes that the above mentioned defects will not take place. For instance, after I have treated the rubber latex, it will, upon being spread out, dry through evaporation of the water and similar volatile constituents to produce a clear, transparent film. Moreover, the treated compound will not be subject to precipitation by the influences referred to above.

As stated above, rubber latex is understood to be an emulsion or colloidal suspension of the several solid constituents, i. e. rubber, proteids, and resins, in water. The emulsion is rather easily disturbed and the solid constituents coagulated. For instance, if rubber latex is rubbed in the palm of the hand it may quickly coagulate into a rubber-like mass. When it is attempted to incorporate certain pigments such as white lead, ochre, bronze blue, red leads, lithopone and zinc oxid with rubber latex, the mixture coagulates to a stiff rubber-like mass. I have also found that when it is attempted to mix rubber latex with paint solvents or thinners, such as turpentine, benzol, benzine or mineral spirits, or with paints or other liquid coating compositions containing mineral spirits, coagulation occurs to a stiff rubber-like mass.

A further object of my invention, therefore, is to render rubber latex miscible with materials employed in the preparation of liquid coating compositions, such as pigments, oils, thinners and the like, to form coating compositions of different colors and properties without coagulation of the solid constituents of the latex.

My invention consists in stabilizing the rubber latex emulsion and rendering it miscible with other materials employed in the production of coating compositions by means of an alkaline agent such as caustic alkali or ammonia. For this purpose, either the rubber latex or the material to be incorporated in or mixed with the latex, or both, may be treated with alkali.

The invention is illustrated by the following examples:

Example 1.

100 parts of china clay and 100 parts of an opaque white pigment such as lithopone or titanimum oxid are mixed together and preferably moistened with a small amount of an alkaline solution such as a 10 per cent solution of ammonia or a 5 per cent solution of caustic soda. The mixture of pigments is then ground together with rubber latex to which has been added a small amount of an alkaline agent, say one part of ammonia, or one part of a 5 per cent solution of caustic soda to ten parts of the rubber latex. The pigment and the latex are combined in suitable proportions to produce a product of the desired fluidity, for instance, to produce a paint adapted to be applied by means of a brush.

The product is stable and when applied to objects with a brush and dried, forms tough durable films of very high moisture resistance and protective properties.

If desired, a small amount of a drying oil, such as linseed or china wood oil may be added to the alkaline latex and pigment composition. The oil may, if desired, be treated with alkali prior to mixing. A small amount of a resin solution or of a resin varnish may also be added.

In the above example the treatment of the pigment prior to mixing it with the latex may be omitted, the alkali necessary to prevent coagulation of the latex being added entirely to the latex. Or only the material to be added to the latex may be treated with alkali. The preference, however, is to treat the latex, or both the latex and the material to be mixed with it, with alkali.

The amount of alkali to be used in the preparation of a coating composition containing rubber latex will vary with the nature of the material to be mixed with the rubber latex. For instance, certain pigments such as white lead, ochre, bronze blue, red lead, lithopone, and zinc oxid, exert a rather strong coagulating effect, and require the use of relatively large amounts of alkali to prevent coagulation, while other pigments such as titanium oxid, whiting and lamp black have a relatively weak coagulating action, and require the use of proportionately smaller amounts of alkali. Vegetable oils have a rather weak coagulating effect, while mineral spirits and the like have a relatively strong coagulating effect. With some materials, coagulation does not take place even though no alkali is added, but with such materials the addition of alkali is preferred since it renders the product more stable.

*Example 2.*

Add a small amount of alkali to a paint composition containing lithopone, china wood oil, rosin and mineral spirits and mix the resulting paint composition with about an equal quantity of rubber latex. A smooth coating composition is obtained. If in this example the alkali is omitted coagulation of the latex takes place.

I have also found that the use of a bactericidal compound, such as benzoate of sodium, as an addition to the alkaline stabilizing agent, is advantageous in that it prevents fermentation. Thus, for example, I have found that the addition of sodium benzoate in amount of about 1/10 of one per cent of the weight of latex employed, is sufficient.

As will be seen, by the use of my invention stable coating compositions may be prepared containing rubber latex and capable of forming protecting films having the desirable characteristics of films formed from pure latex but modified as to color, drying qualities, and cost, to meet a great variety of conditions.

In the appended claims I have employed the expression "drying oil coating material" to designate pigments, oils, resins, gums, thinners, etc., and mixtures thereof such as are customarily employed in liquid coating compositions comprising drying oils.

I claim:

1. Process of preparing protective coating compositions which comprises separately treating rubber latex and a drying oil coating material capable of coagulating raw rubber latex with alkali and mixing the resulting coating material and latex.

2. Process of preparing protective coating compositions which comprises separately treating rubber latex and a pigment capable of coagulating raw rubber latex with alkali and mixing the resulting latex and pigment.

3. A protective coating composition comprising rubber latex, a pigment, a drying oil, and an alkali.

4. A protective coating composition comprising a rubber latex, a pigment, a drying oil, a resin and an alkali.

5. A protective coating composition comprising rubber latex, a pigment, a drying oil, a volatile thinner, and an alkali.

6. A protective coating composition comprising rubber latex, a pigment, a resin, a drying oil, a volatile thinner, and an alkali.

7. A protective coating composition comprising alkaline rubber latex containing sodium benzoate.

In testimony whereof, I affix my signature.

HENRY A. GARDNER.